Patented Aug. 25, 1942

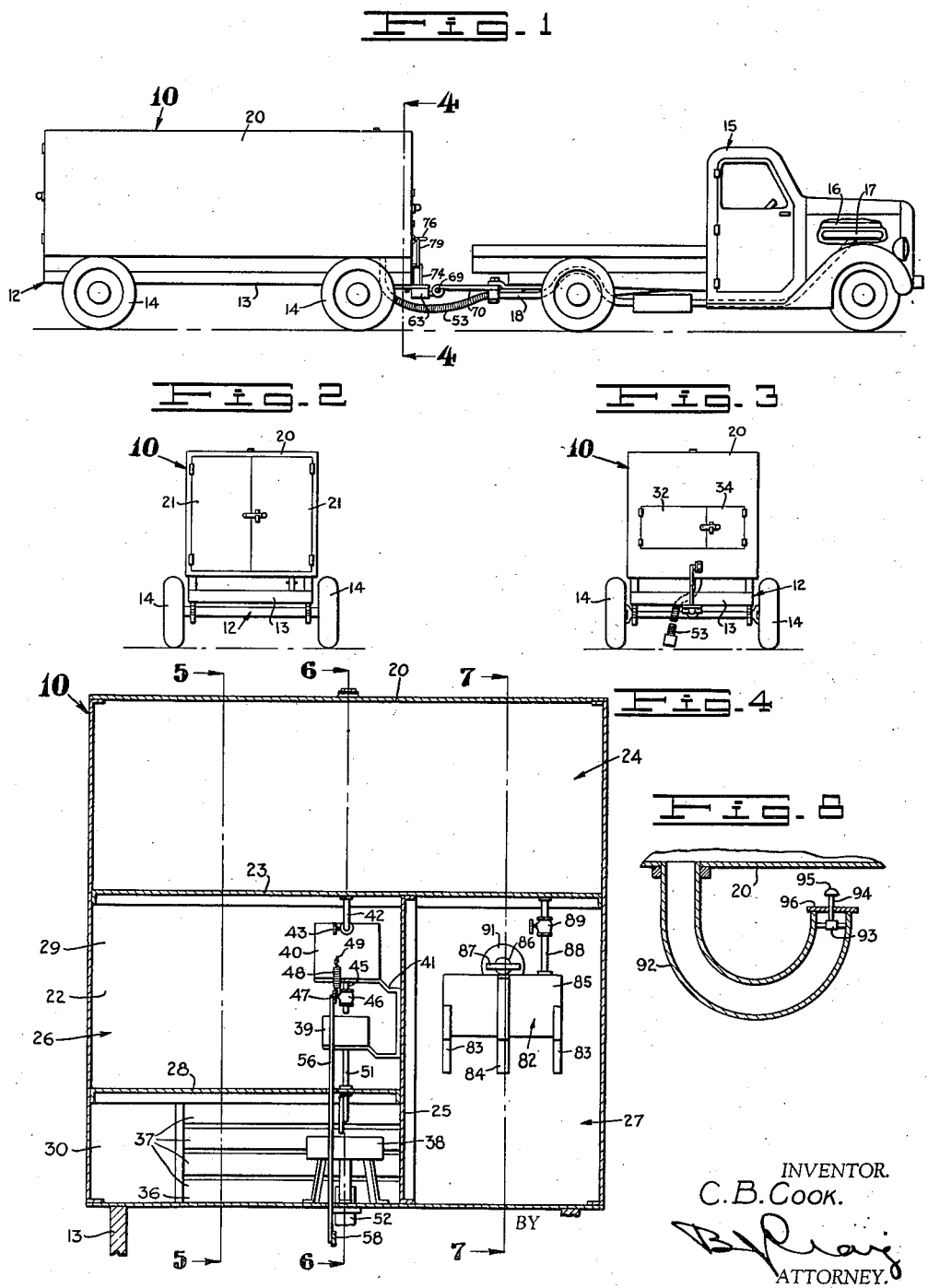

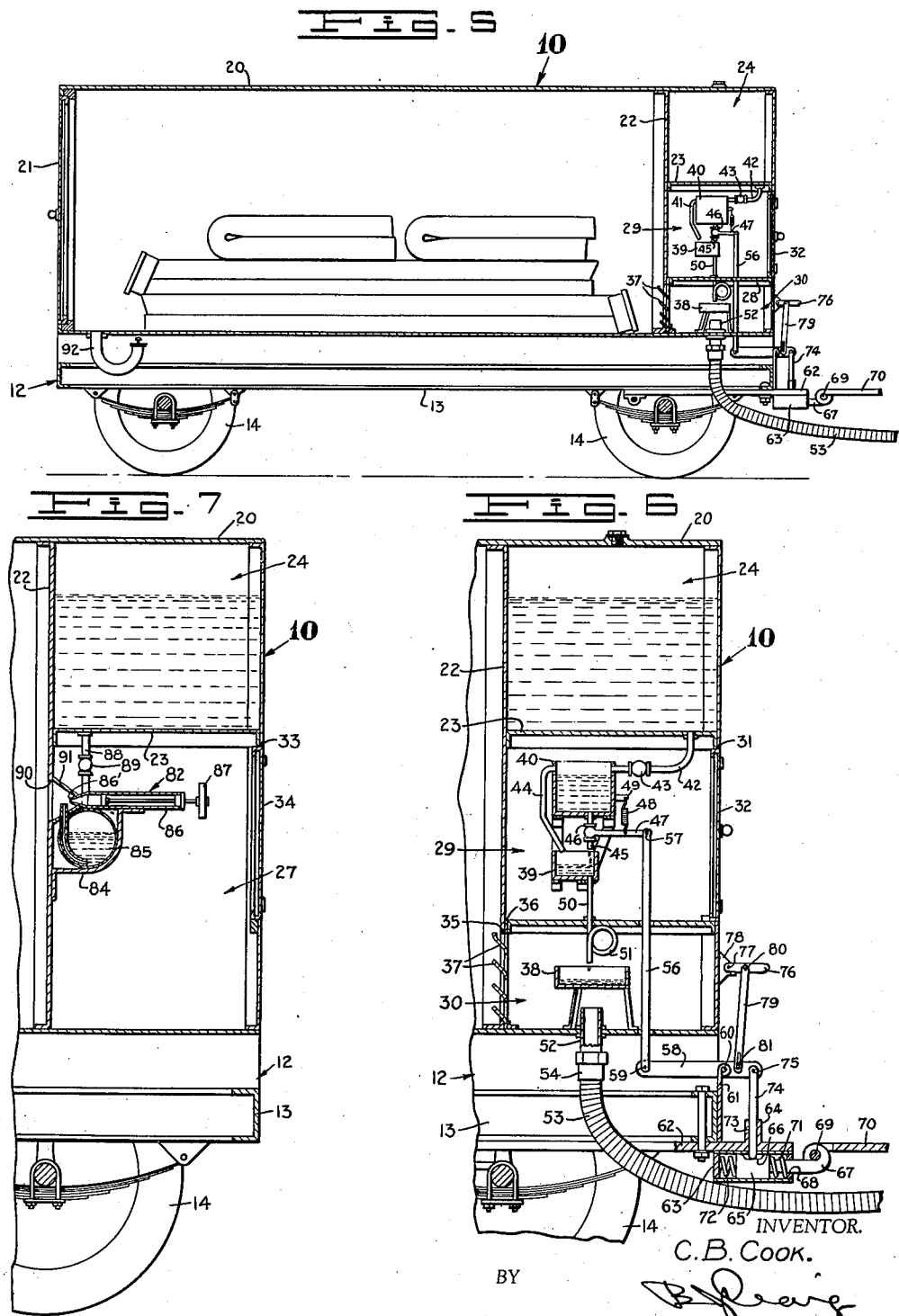

2,293,931

UNITED STATES PATENT OFFICE 2,293,931

PORTABLE FUMIGATING APPARATUS

Charles B. Cook, Los Angeles, Calif.

Application October 31, 1938, Serial No. 237,813

3 Claims. (Cl. 21—121)

This invention relates to improvements in portable fumigating apparatus.

The general object of the invention is to provide a portable fumigating apparatus particularly adapted for fumigating the implements and material used by pickers of fruits.

Another object of the invention is to provide a portable fumigating apparatus in which implements and materials used by fruit pickers are placed and fumigated as they are transported from one place to another.

A further object of the invention is to provide a portable fumigating apparatus associated with an internal combustion engine wherein the exhaust gases from the engine serve in the fumigation process.

A still further object of the invention is to provide an enclosed fumigating trailer drawn by a vehicle propelled by an internal combustion engine and wherein the exhaust gases from the engine serve in the fumigation process.

Another object of my invention is to provide a novel sterilizing method.

Other objects and the advantages of this invention will be apparent from the following description taken in connection with the accompanying drawings, wherein:

Fig. 1 is a side elevation of my improved fumigating trailer showing it operatively coupled to a truck;

Fig. 2 is a rear view of the trailer;

Fig. 3 is a front view of the trailer;

Fig. 4 is an enlarged fragmentary section taken on line 4—4 of Fig. 1;

Fig. 5 is a fragmentary section taken on line 5—5 of Fig. 4;

Fig. 6 is a fragmentary section taken on line 6—6 of Fig. 4;

Fig. 7 is a fragmentary section taken on line 7—7 of Fig. 4; and

Fig. 8 is an enlarged sectional detail of the exhaust conduit of the trailer.

Referring to the drawings by reference characters I have indicated my improved fumigating device generally at 10. In the accompanying drawings I have shown the fumigating device 10 as mounted on four wheeled trailer 12 which includes a frame 13 and supporting wheels 14.

As shown in Fig. 1 the trailer 12 is adapted to be towed by a truck 15 which is propelled by a hydro-carbon engine 16 having an exhaust manifold 17 and an exhaust conduit 18 extending rearwardly therefrom.

The fumigating device 10 comprises a completely enclosed housing 20 having access thereto at the rear through a pair of hinged doors 21 as shown in Fig. 2. Adjacent the front of the housing 20 I provide a transverse vertical partition 22 and between the front of the housing and the partition 22 intermediate the height of the housing I provide a transverse horizontal partition 23 which forms the bottom of a tank compartment 24 (see Fig. 4). At one side of the center of the housing 20 I provide a vertical partition 25 between the bottom of the housing and the partition 23 which divides the space below the partition 23 into two compartments 26 and 27. Intermediate the height of the compartment 26 I provide a horizontal partition 28 which divides the compartment 26 into an upper chamber 29 and a lower chamber 30.

Access into the chamber 29 is through an opening 31 in the front wall of the housing 20 which is closed by a hinged door 32 and access into the compartment 27 is through an opening 33 in the front wall of the housing which is closed by a hinged door 34.

Within the chamber space 30 the vertical partition 22 has an opening 35 therein which is closed by a plate 36 having a plurality of horizontal upwardly inclined louvers 37 therein.

Positioned at approximately the center of the housing 20 within the chamber 30 I provide a pan 38 which is supported a predetermined distance above the bottom of the housing. Above the pan 38 the pan in the chamber 29 I provide receiving tank 39 and spaced above the receiving tank 39 I provide a measuring tank 40. The tanks 39 and 40 are shown as supported by brackets 41 mounted on the partition 25.

A pipe 42 at one end communicates with the interior of the reservoir tank 24 and at the opposite end communicates with the interior of the measuring tank 40. The pipe 42 has a shut off valve 43 interposed therein. One end of an overflow pipe 44 opens into the measuring tank 40 adjacent the top thereof and the lower end is positioned in the receiving tank 39.

Communicating with the interior of the receiving tank 39 through the bottom thereof I provide a vertical pipe 45 the lower end of which is positioned above the receiving tank 39. Interposed in the pipe 45 I provide a control valve 46 which includes an operating arm 47. The operating arm 47 is resiliently retained in a raised closed position by a spring 48 one end of which is connected to the arm 47 and the opposite end of which is anchored to a lug 49 on the receiving tank 39.

One end of a vertical pipe 50 communicates with the interior of the receiving tank 39 through the bottom thereof and extends through the partition 28 into the chamber 30 where the lower end is positioned to direct fluid into the pan 38. Adjacent the lower end thereof the pipe 50 has a loop 51 therein.

A vertical conduit 52 extends through the bottom of the housing 20 into the chamber 30 directly below the pan 38. The lower end of the conduit 52 has one end of a flexible conduit 53 connected thereto by a suitable coupling member 54 and the opposite end is connected to the exhaust conduit 18 of the truck 15.

The upper end of a vertical link 56 is pivotally connected to the control valve arm 47 as at 57 and the lower end is connected to a horizontal rocker arm 58 as at 59. Intermediate the length thereof the rocker arm 58 is pivoted as at 60 to a bracket 61 on the trailer frame.

Mounted on and extending forward of the trailer frame I provide a tongue 62 which includes a closed cylinder portion 63. Intermediate the length of the cylinder 63 the tongue includes an upwardly extending boss 64. Positioned in the cylinder 63 I provide a plunger 65 which on the upper face and intermediate the length thereof is recessed as at 66. The plunger 65 includes a reduced stem portion 67 which extends out through an aperture 68 in the forward end of the cylinder 63 and is horizontally pivotally connected as at 69 to a draw bar 70 of the truck 15. Surrounding the stem 67 between the plunger 65 and the forward end of the cylinder 63 I provide a coiled spring 71 and between the rear end of the cylinder and the plunger I provide a coiled spring 72. The springs 71 and 72 are adapted to normally resiliently retain the plunger 65 intermediate the length of the cylinder 63. The boss 64 and the cylinder have an aperture 73 therein in which a vertical rod 74 is positioned. The lower end of the rod 74 is positioned in the recessed portion 66 of the plunger 65 and the upper end is slackly connected as at 75 to the rocker arm 58.

When the truck 15 moves forward the draw bar 70 pulls the stem 67 forward which in turn pulls the plunger 65 forward against the action of the spring 71 and thereafter the trailer 12 moves forward with the truck. As the plunger 65 is thus moved it forces the rod 74 upwardly thereby swinging the forward end of the rocker arm 58 upwardly and the rear end downwardly thereby pulling the link 56 downwardly which in turn swings the valve arm 47 downwardly against the action of the spring 48 to a position to open the valve 46.

When the truck 15 and trailer 12 go down hill and the inertia of the trailer overcomes the pull on the draw bar the plunger 65 is moved rearwardly in the cylinder 63 against the action of the rear spring 72. As the plunger moves rearwardly it raises the rod 74 and actuates the valve 46 to an open position in the same manner as when the draw bar acts to tow the trailer.

For opening the valve 46 manually I provide a hand lever 76 which adjacent one end is pivotally connected as at 77 to a bracket 78 on the rear wall of the housing 20. Intermediate the length thereof the hand lever 76 has the upper end of a vertical link 79 pivotally connected thereto as at 80. The lower portion of the link 79 is slackly connected as at 81 to the rocker arm 58 intermediate the pivot 60 and the rod 74. Normally the hand lever 76 is in a horizontal position as shown in Fig. 6 and the rocker arm 58 is free to swing on its pivot without disturbing the link 79 or the hand lever. To manually open the valve 46 an operator swings the hand lever 76 upwardly thereby moving the link 79 upwardly which in turn swings the front end of the rocker arm 58 upwardly and the rear end downwardly thereby moving the link 56 downwardly which in turn swings the valve arm 47 downwardly to actuate the valve 46 to an open position. When the arm 76 is raised it is moved against the front wall of the housing and the pivot 80 is then moved beyond the pivot 77 in which position it will remain until manually moved to a down position.

Positioned in the compartment 27 I provide a hand operated spray gun 82 which is shown as supported by end brackets 83 and a center bracket 84 mounted on the partition 22. The spray gun 82 may be of any standard design including a fluid supply tank 85 and an air cylinder 86 having a plunger therein adapted to be reciprocated by a handle member 87. The nozzle portion 86' of the air cylinder 86 is directed towards the partition 22. The upper end of a pipe 88 communicates with the interior of the tank compartment 24 and the lower end communicates with the interior of the spray gun tank 85. The pipe 88 has a shut off valve 89 interposed therein to control passage therethrough.

Coaxial with the air cylinder 86 I provide an enlarged aperture 90 in the partition 22 (see Fig. 7). Surrounding the aperture 90 I provide a hollow frustro-conical member 91 the large end of which engages the face of the partition 22 in the compartment 27 and the small end of which surrounds the nozzle portion 86' of the air cylinder 86.

Adjacent the rear of the housing 20 I provide an outlet conduit 92 one end of which opens into the housing 20 through the bottom thereof (see Fig. 8). The conduit 92 extends downwardly and is then curved upwardly with the free end thereof directed towards the bottom of the housing 20. Within the conduit 92 adjacent the free end thereof I provide a bracket 93 which supports a vertical pin 94 having an enlarged head 95 thereon. Positioned on the free end of the conduit 92 I provide a disc 96 which is suitably apertured to receive the pin 94 and is freely movable on the pin 94.

In operation the tank compartment 24 is filled with a suitable liquid insecticide. When it is desired to move pickers' equipment such as ladders, picking bags, clippers, etc. from one grove to another the rear doors 21 of the housing 20 are opened and the equipment placed within the housing and the doors closed. The operator then opens the front door 32 and opens the valve 43 to allow insecticide from the tank 24 to run into the measuring tank 40. The operator fills the tank 40 until the insecticide overflows through the overflow pipe 44 whereupon he closes the valve 43 and then closes the door 32. The operator may, if he thinks it necessary, open the door 34 and open the valve 89 to allow a quantity of insecticide to flow from the tank 24 into the air gun tank 85 and then close the valve 89. Thereafter by reciprocating the air gun handle 87 the operator sprays a quantity of insecticide into the housing whereafter the operator closes the door 34. The operator then starts the engine 16 of the truck 15 and proceeds to his destination.

When the engine 16 is running the exhaust gases therefrom pass through the exhaust conduit 18 into and through the flexible conduit 53 into the conduit 52. The conduit 52 directs the exhaust gases against the bottom of the pan 38 which after striking the pan 38 pass out of the chamber 30 through the louvers 37 into the housing 20. When the truck proceeds forward the draw bar 70 opens the valve 46 in the manner previously described. When the valve 46 opens the insecticide in the measuring tank 40 passes downwardly through the pipe 45 and drips therefrom into the receiver tank 39 whence it flows downwardly through the pipe 50 into the pan 38. The hot exhaust gases striking the bottom of the pan 38 heat and vaporize the insecticide therein which then mixes with the exhaust gases and is carried into the housing 20.

The disc 96 on the end of the outlet conduit 92 causes a slight pressure to be built up within the housing until the pressure therein is sufficient to lift the disc whereupon some of the gases within the housing pass therefrom through the outlet conduit 92. Any equipment in the housing 20 is thoroughly saturated with the mixture of hot exhaust gases and the insecticide fumes which kill any insects or pests that may be on the equipment.

If the distance from one grove to the second is short, the operator upon arriving at the second grove leaves the engine 15 running and if the draw bar 70 has allowed the plunger 65 to return to a neutral position, the operator raises the hand lever 76 to reopen the valve 46 as previously described. After all the insecticide in the measuring tank 40 has been used the operator swings the hand lever 76 downwardly to close the valve 46 and then shuts off the engine 15. Thereafter the rear doors 21 are opened and the picking equipment removed from the housing 20.

As an insecticide I prefer to use carbon tetrachloride which has good insecticidal properties and which is non-explosive so that it prevents explosions within the sterilizing chamber which might result from explosive gases in the products of combustion.

The picking equipment having been thoroughly fumigated while being transported from one grove to another any danger of transporting harmful insects and pests from the first to the second grove is eliminated.

From the foregoing description it will be apparent that I have provided a novel fumigating apparatus which is simple in construction and highly efficient in use.

Having thus described my invention I claim:

1. In a device of the class described, a wheeled trailer member adapted to be towed by a vehicle, a fumigating apparatus on said trailer, said apparatus including a closed housing member, a chamber, means to afford communication between said chamber and the interior of said housing, valve means to direct insecticide into said chamber, means to direct exhaust gases from an internal combustion engine into said chamber, a drawbar, means connecting the drawbar to the trailer, a control for said valve means, link means operated by the drawbar connecting means and means operated by the link means for actuating the valve means.

2. The combination of a vehicle unit comprising a truck propelled by an internal combustion engine and a trailer, a fumigating apparatus on the trailer, said fumigating apparatus including a closed housing member, a liquid supply tank, a chamber, means to afford communication between the chamber and the interior of said housing, a receptacle in said chamber, conduit means to direct fluid from said tank into said receptacle, valve means to control passage through said conduit, means to normally retain said valve means in a position to restrict passage through said conduit, means to direct exhaust gases from the internal combustion engine into said chamber and against the receptacle, a drawbar on said truck, a plunger on said trailer, said plunger including a portion engaged by the drawbar to pull the trailer and means connecting the plunger and the valve means to operate the latter.

3. The combination of a vehicle unit comprising a truck propelled by an internal combustion engine and a trailer and a fumigating apparatus mounted on said unit, said apparatus including a closed housing member, a liquid supply tank, a chamber, means to afford communication between said chamber and the interior of said housing, a receptacle supported in said chamber, conduit means to direct fluid from said tank into said receptacle, means to direct exhaust gases from the internal combustion engine against the receptacle, valve means to control passage through said conduit, means to normally retain said valve means in a position to restrict passage through said conduit, a drawbar on said truck, a plunger on said trailer, said plunger including a portion engaged by the drawbar to pull the trailer, and means connecting the plunger and the valve means to operate the latter.

CHARLES B. COOK.